United States Patent Office 3,658,941
Patented Apr. 25, 1972

3,658,941
3,3,3',3'-TETRAMETHYL - 6,6'-DI(2-HYDROXYPRO-POXY)-1,1'-SPIROBIINDANE AND POLYESTERS DERIVED THEREFROM
Erkki J. Pulkkinen, Morris Plains, N.J., assignor to Allied Chemical Corporation, New York, N.Y.
No Drawing. Original application Dec. 13, 1968, Ser. No. 783,721. Divided and this application Sept. 21, 1970, Ser. No. 74,141
Int. Cl. C08f 11/02, 21/02
U.S. Cl. 260—861                                             5 Claims

ABSTRACT OF THE DISCLOSURE

This invention relates to the propoxylation of 3,3,3',3'-tetramethyl-6,6'-dihydroxy-1,1'-spirobiindane to form 3,3,3',3'-tetramethyl - 6,6' - di(2 - hydroxypropoxy)-1,1'-spirobiindane and to the reaction of this latter compound with an ethylenically unsaturated dicarboxylic acid to give an unsaturated polyester. These unsaturated polyesters can be cross-linked with styrene to give a cured polyester having excellent chemical resistance which is useful in films, molded articles and in reinforced sheets such as polyester impregnated glass fabric.

In accordance with the present invention 3,3,3',3'-tetramethyl-6,6'-dihydroxy-1,1'-spirobiindane is reacted with propylene oxide to give 3,3,3'3'-tetramethyl-6,6'-di(2-hydroxypropoxy)-1,1'-spirobiindane as illustrated by the folling equation:

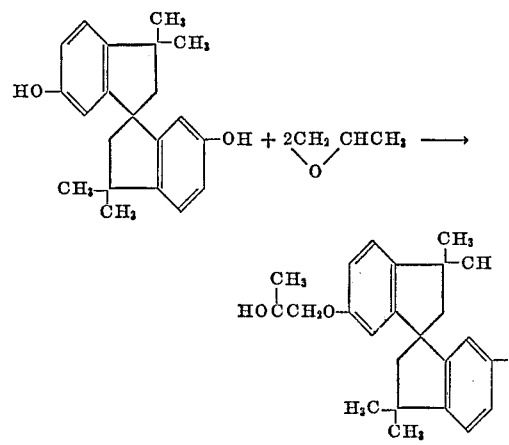

The reaction temperature is preferably about 50–150° C. The reaction can be conveniently carried out in a solvent medium such as an alkanol of 1–3 carbon atoms, tetrahydrofuran, dimethyl sulfoxide, carbitol, butyl Carbitol sulfolane and methyl-, ethyl- and butyl-cellosolve. The reaction may be catalyzed by the presence of certain bases including triethanolamine and alkali metal alkoxide such as sodium and potassium methoxide and propoxide. Preferably about 2–10 moles of propylene oxide are employed per mole of 3,3,3',3'-tetramethyl-6,6'-dihydroxy-1,1'-spirobiindane.

The 3,3,3',3' - tetramethyl-6,6'-di(2-hydroxypropoxy)-1,1'-spirobiindane can be reacted with an acidic compound, i.e., fumaric acid, maleic acid, or maleic anhydride, to give an unsaturated polyester in accordance with the following equation:

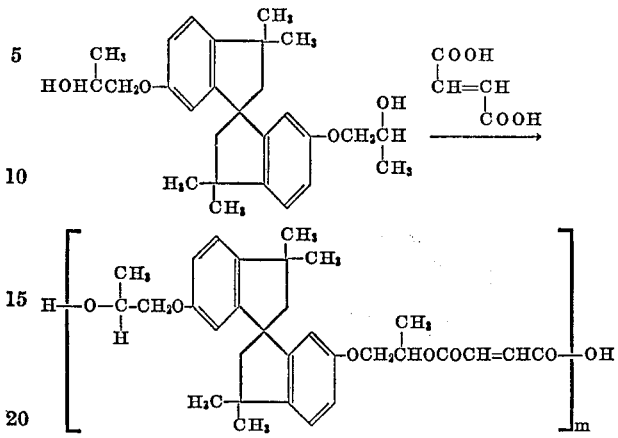

This reaction is preferably carried out at a temperature of 150–240° C. An excess of either reactant can be used but approximately equimolar amounts of 3,3,3',3'-tetramethyl - 6,6' - di(2-hydroxypropoxy)-1,1'-spirobiindane and the acidic compound are preferred. A portion of the 3,3,3',3'-tetramethyl - 6,6' - di(2 - hydroxypropoxy)-1,1'-spirobiindane can be replaced with another bisphenol compound. For instance, useful polyesters can be prepared by replacing up to 90% of the 3,3,3',3'-tetramethyl-6,6'-di-(2-hydroxypropoxy)1,1'-spirobiindane with 2,2-bis(4-hydroxyphenyl) propane, which has been propoxylated as above.

The unsaturated polyesters can be cured or cross-linked with an unsaturated monomer such as styrene to give a cured polymer useful in films and molded articles. Additionally, the polyester can be impregnated onto a reinforced material such as glass fabric and then cured to give a structural materail useful in boat hulls, building materials, etc. In curing the polyester a peroxide catalyst such as benzoyl peroxide is generally used. The cured polyesters of this invention are characterized by excellent chemical resistance to such materials as gasoline, ammonia, water and sulfuric acid.

The following examples are given to further illustrate the invention but it is to be understood that the invention is not to be limited to the details disclosed therein.

EXAMPLE 1

Propylene oxide (92.9 grams) was dissolved in 250 ml. of 95% ethyl alcohol containing 3.85 grams of sodium methoxide and 100 grams of 3,3,3',3'-tetramethyl-6,6'-dihydroxyl-1,1'-spirobiindane. An additional 390 ml. of ethanol were then added and the reaction mixture heated at about 70–80° C. for 2 and ½ hours. The reaction mixture was cooled and diluted with water to precipitate a white crystalline product. This precipitate was recovered by filtratiton and dried in an oven at 180° C. There was thus obtained 133.5 grams of 3,3,3',3'-tetramethyl-6,6'-di(2-hydroxypropoxy)-1,1'-spirobiindane having a melting point of 201° C.

EXAMPLE 2

A mixture of 256 grams of 3,3,3'3'-tetramethyl-6,6'-di((2-hydroxypropoxy)-1,1'-spirobiindane, 69.5 grams of fumaric acid and 0.27 gram of hydroquinone were stirred in mesitylene under a nitrogen atomosphere for one hour at 178–198° C. The temperature was then raised to 200° C. for 6 hours and then to 210° C. for 6 hours. Vacuum (18 mm. Hg) was then applied and heating continued for 3½ hours. The reaction product was dissolved in methylene chloride, solid material removed by filtration and the filtrate evaporated to dryness. The product recovered after removal of the methylene chloride solvent was the polyester of 3,3,3',3'-tetramethyl-6,6'-di(2-hydroxypropoxy)-1,1'-spirobiindane and fumaric acid having an acid number of 9.19 and a hydroxy number of 53.

EXAMPLE 3

2,2-bis(4-hydroxyphenyl)propane was propoxylated using the method of Example 1 to form 2,2-bis[4,4'-( -hydroxypropoxy)phenyl]propane.

The procedure of Example 2 was repeated using 153 grams of 3,3,3',3'-tetramethyl-6,6'-di(2-hydroxypropoxy)-1,1'-spirobiindane, 153 grams of the propoxylated 2,2-bis(4-hydroxyphenyl)propane, 93.3 grams of fumaric acid and 0.36 grams hydroquinone. The polyester obtained had an acid number of 13.4 and a hydroxyl number of 13.4.

EXAMPLE 4

Samples (400 grams) of the polyesters of Examples 2 and 3 were each dissolved in 490 grams of styrene. Benzoyl peroxide (10 grams) was added to each of the solutions and the solutions cured between glass plates at 120° F. for 24 hours and then at 245° F. for 2¼ hours. There was thus obtained 2 sheets of cured polyester resin. Samples of these sheets were placed in test solutions to determine their chemical resistance. The results of these tests with polyester A being derived from the polyester of Example 2 and polyester B being derived from the polyester of Example 3 are as follows.

TABLE I

| Polyester | | Percent change in weight | | |
|---|---|---|---|---|
| | | 1 week | 1 month | 3 months |
| A | }25% NH₃ at 90° F | | | 1.7 |
| B | | | | 2.32 |
| A | }Ethyl gasoline at 90° F | 0.10 | 0.19 | 0.42 |
| B | | 0.26 | 0.46 | 0.70 |
| A | }Water at 158° F | 0.43 | 0.43 | 0.45 |
| B | | 0.51 | 0.44 | 0.16 |
| A | }5% NaOH at 158° F | 0.47 | 0.40 | 0.42 |
| B | | 0.48 | 0.31 | 0.01 |
| A | }5% H₂SO₄ at 158° F | 0.48 | 0.48 | 0.50 |
| B | | 0.43 | 0.43 | 0.08 |

It is apparent that many modifications and variations may be effected without departing from the scope of the present invention and the illustrative details disclosed herein are not to be construed as imposing undue limitations on the invention.

I claim:

1. A process comprising reacting 3,3,3',3'-tetramethyl-6,6'-di(2-hydroxypropoxy) - 1,1' - spirobiindane with an acidic compound selected from the group consisting of fumaric acid, maleic acid, and maleic anhydride at a temperature of 150–240° C. to form a polyester comprising repeating units of the formula

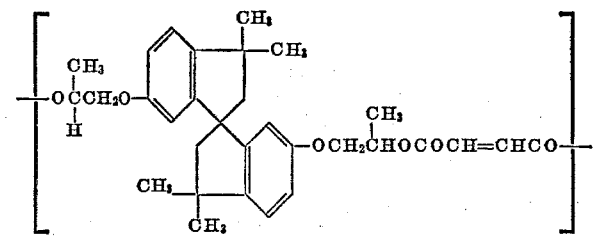

2. A polyester comprising repeating units of the formula

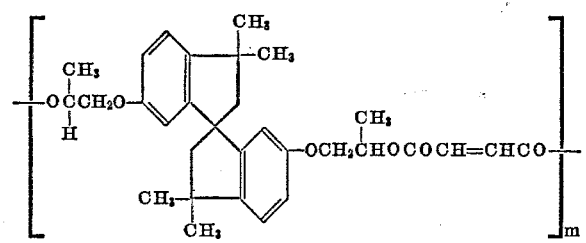

3. A curable composition comprising the polyester of claim 2 and styrene.

4. A polyester of 3,3,3',3' - tetramethyl - 6,6'-di(20-hydroxypropoxy)-1,1' - spirobiindane; propoxylated 2,2-bis-(4-hydroxyphenyl)propane and an acidic compound selected from the group consisting of fumaric acid, maleic acid and maleic anhydride.

5. A curable composition comprising the polyester of claim 4 and styrene.

References Cited

UNITED STATES PATENTS 3,214,491  10/1965  Stanton _____ 270—871
2,856,378  10/1958  Lundberg _____ 260—31.6

OTHER REFERENCES

"Polymers containing the 3,3,3',3'-tetramethyl-1,1'-spirobiindane residue", Steuben, J. Polymer Science, Part A, vol. 3, pp. 3209–17 (1965).

WILLIAM H. SHORT, Primary Examiner

E. A. NIELSEN, Assistant Examiner

U.S. Cl. X.R.

260—75 UA; 161—195